US006700769B2

(12) United States Patent
Phillips et al.

(10) Patent No.: US 6,700,769 B2
(45) Date of Patent: Mar. 2, 2004

(54) CARRIER ASSEMBLY FOR MULTIPLE PIN INSERTION

(75) Inventors: Paul Joseph Phillips, Middlebury, CT (US); Kennon Bryant Porter, Bonham, TX (US); Patrick Gustavo Salas, Unionville, CT (US); Avra Poddar, West Bengal (IN); Satishbabu Palla, Hyderabad (IN); Veeresh Somalingayya, Bangalore (IN)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 09/682,143

(22) Filed: Jul. 26, 2001

(65) Prior Publication Data

US 2003/0022529 A1 Jan. 30, 2003

(51) Int. Cl.$^{7}$ .............................. H02H 1/00; H02H 3/22

(52) U.S. Cl. ........................ 361/119; 361/111; 361/91.2

(58) Field of Search .................................. 361/119, 111, 361/120, 124, 363, 356, 56, 54, 91, 118

(56) References Cited

U.S. PATENT DOCUMENTS

| | | | | | |
|---|---|---|---|---|---|
| 5,010,438 | A | * | 4/1991 | Brady | 361/86 |
| 5,384,679 | A | * | 1/1995 | Smith | 361/119 |
| 5,457,593 | A | * | 10/1995 | Glaser et al. | 361/119 |
| 6,071,126 | A | | 6/2000 | Daoud | 439/49 |
| 6,084,761 | A | | 7/2000 | Casey et al. | 361/119 |

* cited by examiner

*Primary Examiner*—Rajnikant B. Patel
(74) *Attorney, Agent, or Firm*—Cantor Colburn LLP

(57) ABSTRACT

A carrier assembly for a surge protection assembly includes: a connector strip; a plurality of pins extending from the connFiguresector strip; and wherein the connector strip and the plurality of pins are formed from a single piece of conductive material.

20 Claims, 7 Drawing Sheets

CARRIER ASSEMBLY FOR MULTIPLE PIN INSERTION

BACKGROUND OF INVENTION

Surge protectors protect voltage sensitive equipment connected to electrical lines by discharging high voltage signals or current surges to ground before the high voltage signal can damage the equipment. Telecommunications systems employ very large numbers of surge protectors to connect voltage sensitive switching equipment and other equipment to outside telephone lines. Telephone lines, which normally carry relatively low voltage message signals, are subject to current surges caused by lightning and other extrinsic phenomena associated with the location of the telephone lines.

Each telephone line includes a pair of wires, referred to as the “tip” line and the “ring” line, that carry the message signal. Each tip and ring line is connected through an industry standard surge protector device having five pins: one for an incoming wire and one for an outgoing wire for each tip line; one for an incoming wire and one outgoing wire for each ring line; and one to connect to ground. The surge protector device passes low-voltage signals traveling between the incoming and outgoing wires for a given line, but discharges current surges on the line to the ground pin, which in turn is connected to a ground line.

Surge protectors include a surge protector base. The base serves to provide a rigid structural platform for supporting a plurality of surge protector devices for coupling to multi-line telecommunications cables. Generally, the base can handle ten, twenty-five, fifty and one hundred surge protector devices for coupling to an equal number of communication lines.

The base is fabricated as a single slab of plastic insulating material with a plurality of holes formed in the slab. Into each hole is inserted a metal socket that faces toward a rear side of the base. There are a plurality of connector pins and ground pins that are inserted through the metal sockets. Each pin of a surge protector device fits into one of these metal sockets and forms with the socket as a compression fit to establish a good electrical connection. Extending from each hole on a front side of the protector base are both connector pins and ground pins. After each ground pins are inserted into the metal sockets, a rail is laid across each ground pin and then soldered to each ground pin. The rail is then connected to a ground line. Inserting each ground pin into each metal socket and soldering each ground pin to the rail is a time consuming and inefficient process.

SUMMARY OF INVENTION

The above discussed and other drawbacks and deficiencies of the prior art are overcome or alleviated by a carrier assembly for a surge protection assembly. In an exemplary embodiment of the invention, a carrier assembly for a surge protection assembly includes: a connector strip; a plurality of pins extending from the connector strip; and wherein the connector strip and the plurality of pins are formed from a single piece of conductive material.

BRIEF DESCRIPTION OF DRAWINGS

Referring to the exemplary drawings wherein like elements are numbered alike in the several Figures.

DETAILED DESCRIPTION

Figure 1:
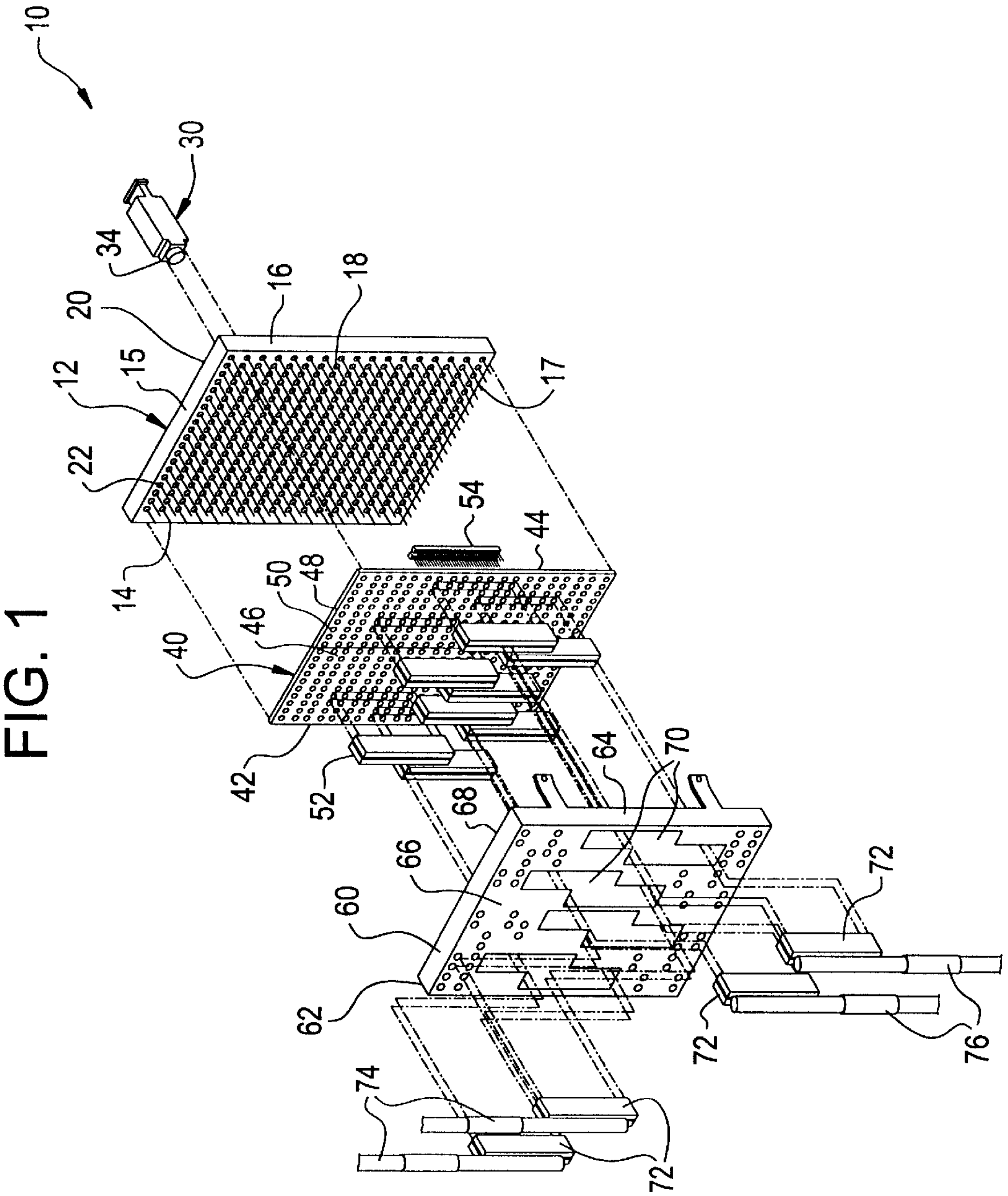
FIG. 1 is an exploded view of a surge protector assembly.

Referring to FIG. 1, a surge protector assembly 10 is illustrated. Surge protector assembly 10 includes a base 12 with a first end 14, a second end 16, a third end 15, a fourth end 17, a front surface 18, and a rear surface 20. First end 14 and second end 16 are generally straight and parallel with each other. Third end 15 and fourth end 17 are generally straight and parallel with each other. Together, first end 14, second end 16, third end 15, and fourth end 17 for a square. Base 12 is formed using a rigid slab of plastic or other electrically insulating material.

Base 12 contains a plurality of holes 22, which passes from front surface 18 through to rear surface 20. At rear surface 20, a metal socket (not shown) is inserted into each hole. Surge protection devices 30 (only one shown) are mounted at rear surface 20 of base 12. Each surge protection device 30 includes a base member 32 having a plurality of connector pins 34 extending therefrom. When surge protection device 30 is mounted to base 12, connector pins 34 extend from rear surface through holes 22 to front surface 18. Each connector pin 34 and metal socket (not shown) form a compression fit to establish a good electrical connection. A multi-layer printed circuit board 40 is mounted to front surface 18 of base 12.

Circuit board 40 includes a first end 42, a second end 44, a front surface 46, and a rear surface 48. Circuit board 40 also includes sockets 50, which are formed by a hole plated with metal and extending from front surface 46 to rear surface 48 in circuit board 40. Connector pins 34 are inserted into each socket 42 at circuit board 40. Circuit board 40 is formed from multiple layers of dielectric material, such as fiberglass, bonded together. Each layer of circuit board 40 is fabricated with a predetermined pattern of metal traces or “runs” using a conventional subtractive process. Connector sockets 52 are mounted to front surface 46 of circuit board 40, by passing pins 54 through rear surface 48 to front surface 46 and inserting pins 54 into connector sockets 52. Pins 54 extend through connector socket 52. An aluminum hood 60 is mounted to front surface 46 of circuit board 40 and is coupled to base 12.

Aluminum hood 60 includes a first end 62, a second end 64, a front surface 66, and a rear surface 68. Aluminum hood 60 includes rectangular holes 70 that extend from front surface 66 to rear surface 68. Each hole 70 has dimensions slightly larger than connector socket 52 so that connector socket 52 can extend through hole 70. In addition, connector sockets 72 are coupled with connector sockets 52 and are held together by connector pin 54. Pins 54 are either soldered to connector socket 72 or are a compression fit pin. A line-in cable 74 is coupled with connector socket 72 and a line-out cable 76 is coupled with connector socket 72. Both line-in cable 74 and line-out cable 76 include a plurality of communication lines 77.

Figure 2:
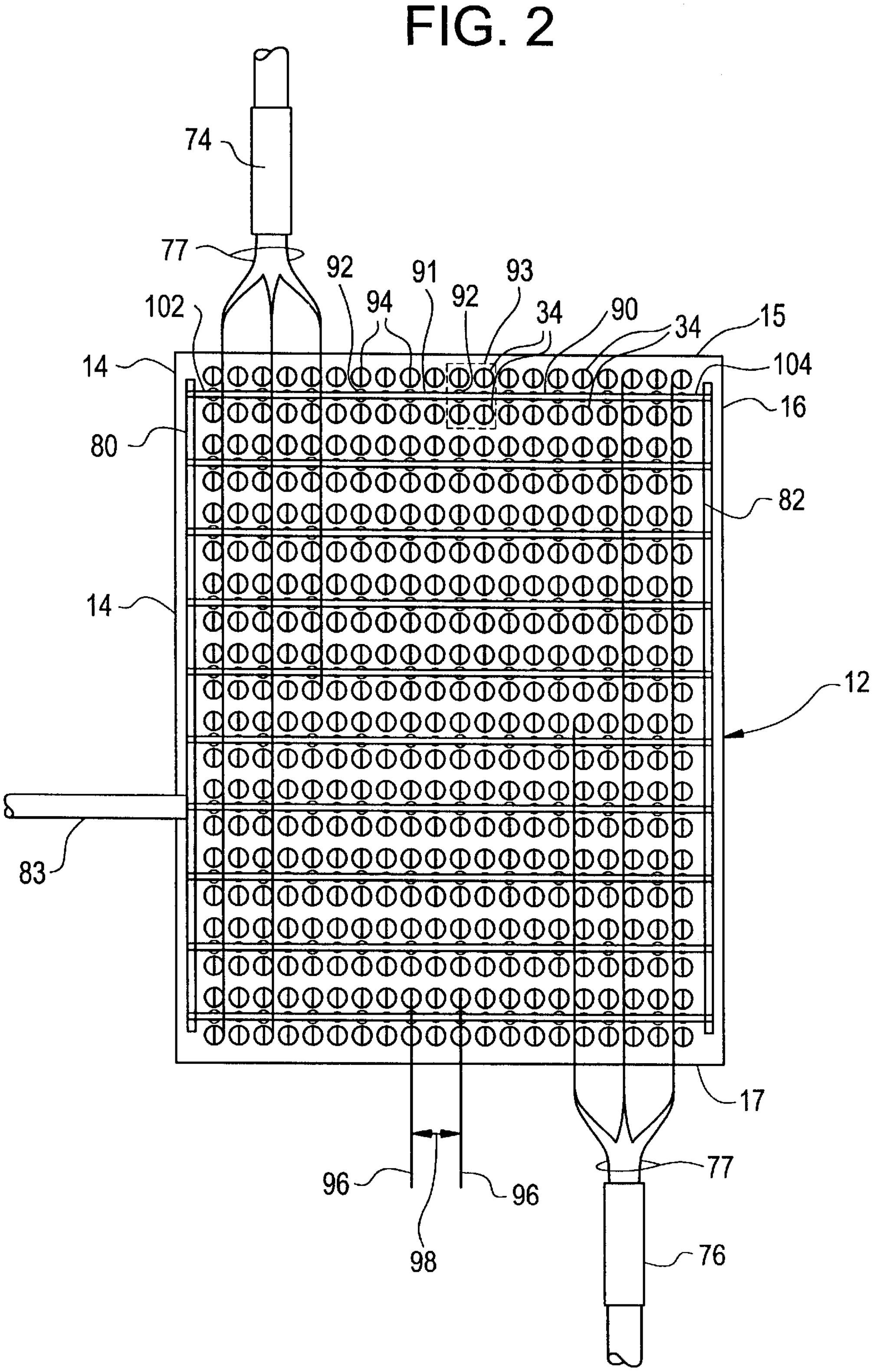
FIG. 2 is a plan view of a base of the surge protector assembly of FIG. 1.

Referring to FIG. 2, base 12 is shown in more detail. Base 12 includes a first transverse rail 80 extending along first end 14 and a second transverse rail 82 extending along at second end 16. First transverse rail 80 is an elongated strip of conductive material coupled to a ground line 83. Base 12 also includes a carrier assembly 90 located between rows of connector pins 34 and extending generally parallel to third and fourth ends 15 and 17. Carrier assembly 90 includes a connector strip 91 and a plurality of ground pins 92 electrically connected to connector strip 91. Connector strip 91 is an elongated strip of conductive material including a first end 102 coupled to first transverse rail 80 and a second end 104 coupled to second transverse rail 82. Connector strip 91 may be coupled to first and second transverse rails 80 and 82 by soldering.

Extending through base 12 from front surface 18 through to rear surface 20 (not shown) are holes 94. Holes 94 are generally formed in a line and are parallel to sides 15 and 17. Ground pins 92 extend through every other hole 94 and are flush at rear surface 20. Each hole 94 has a centerline 96, and the spacing from centerline 96 of one hole 94 to centerline 96 of another hole 94 is a predetermined distance 98. A grouping 93 of four connector pins 34 and one ground pin 92 completes one surge protection device 30.

Figure 3:
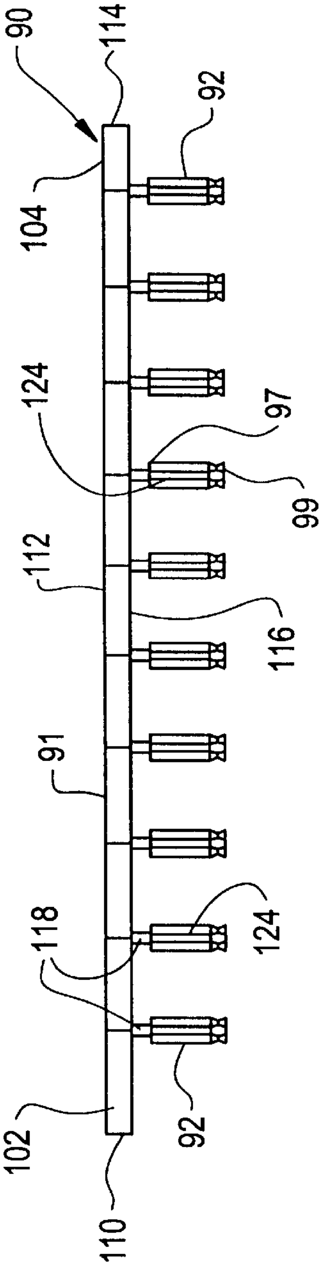
FIG. 3 is a front view of a carrier assembly for the surge protector assembly of FIG. 1.
Figure 4:
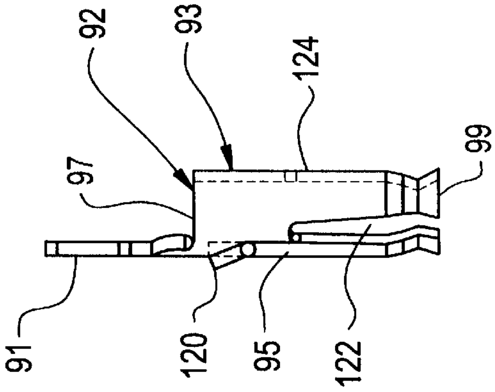
FIG. 4 is a ground pin of the carrier assembly of FIG. 3.

Referring to FIGS. 3 and 4, carrier assembly 90 is depicted in greater detail. Connector strip 91 includes first side 110, a second side 112, a third side 114, and a fourth side 116. First side 110 and third side 114 are generally straight and parallel to each other. Second side 112 and fourth side 116 are generally straight and parallel to each other. Carrier assembly 90 also includes a connector piece 118 that connects connector strip 91 to ground pin 92. Ground pin 92 includes a body portion 93 shaped generally as a cylindrical shell. Extending from a side 95 of body portion 93 is a lance 120, which is located near an end 97 of body portion 93 proximate connector strip 91. A slot 124 is formed in the outside diameter of body portion 93, and extends from end 97 of body portion 93 to an end 99. Two additional slots 122 are also formed in body portion 93. Those additional slots 122 are evenly spaced around the periphery of body portion 93 and extend from end 99 to a point generally midway between ends 97 and 99.

Figures 5, 6:
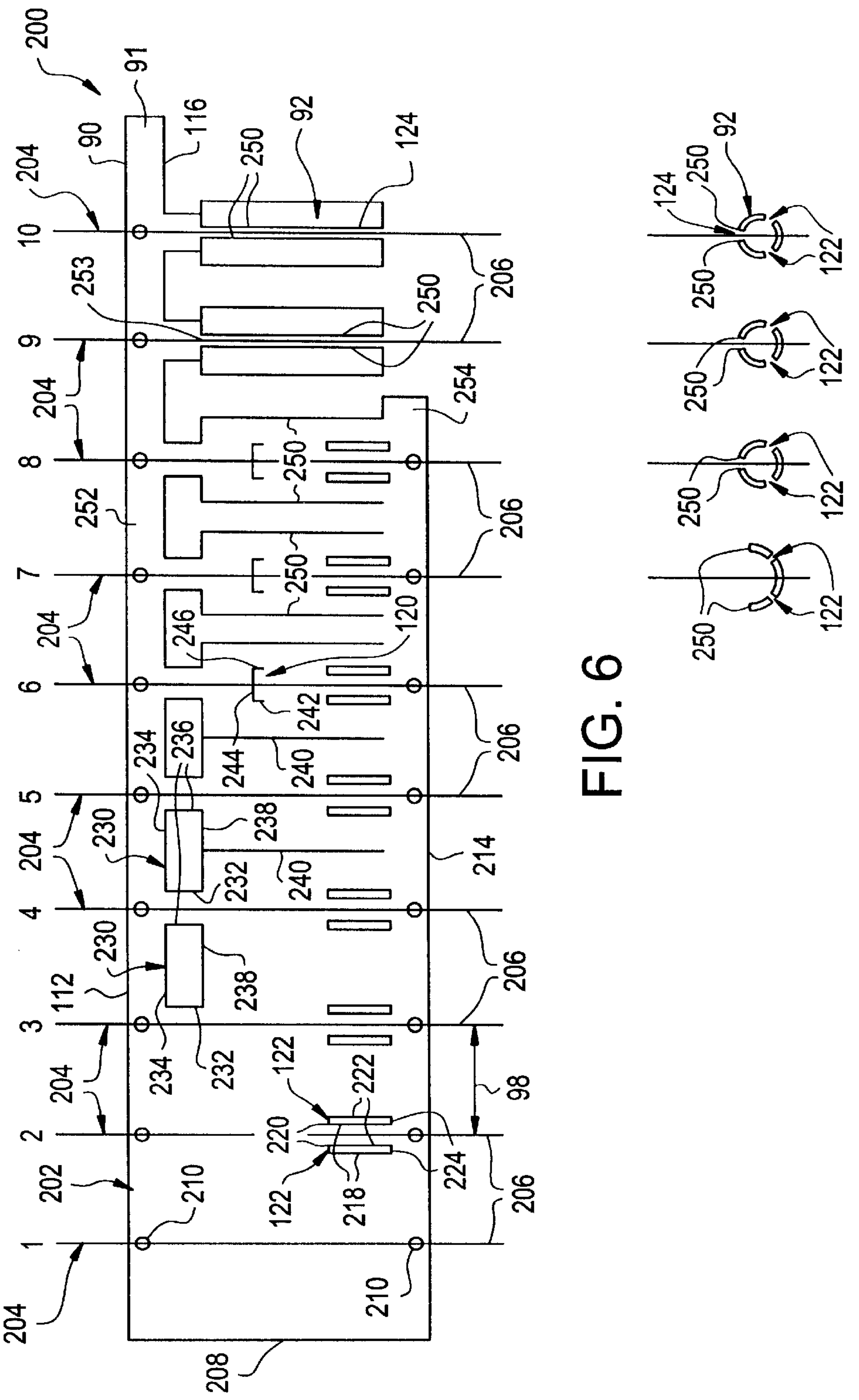
FIG. 5 is a top view of a progressive die manufacturing process for a carrier assembly.
FIG. 6 is a side view of the progressive die manufacturing process of FIG. 5.

Referring to FIG. 5, an embodiment of a progressive die manufacturing process 200 for carrier assembly 90 is illustrated. Carrier assembly 90 is manufactured from a strip 202 of conductive material, such as metal or the like. Progressive die manufacturing process 200 includes strip 202 proceeding through a plurality of stations 204, which are numbered one to ten. At each station 204, a specific function, such as gutting, lancing, rolling, or the like, is performed on strip 202 to form strip 202 eventually into carrier assembly 90. Each station 204 has a centerline 206. Each centerline 206 of each station 204 is separated by the same predetermined distance 98 as each centerline 96 (shown on FIG. 2) of each hole 94 (shown on FIG. 2) in base 12 (shown on FIG. 2).

Referring to FIGS. 5 and 6, progressive die manufacturing process 200 occurs as follows. Strip 202 is inserted into progressive die machine (not shown) at a first end 208 of strip 202. At station 1, pilot holes 210 are punched into strip 202. Pilot holes 210 are located adjacent second side 112 and a third end 214 of strip 202. Pilot holes 210 are small round holes that are used to guide strip 202 through progressive die machine. At station 2, two slots 122 are gutted out of strip 202. Slots 122 are generally rectangular in shape with a first side 218, a second side 220, a third side 222, and a fourth side 224. First side 218 and third side are generally straight and parallel to first end 208 of strip 202. Second side 220 and fourth side 224 are generally straight and parallel to second side 112 and third end 214 of strip 102. Slots 122 are also located near third end 214. At station 3, there is no activity. This open station allows for additional functions to be added at a later date, if needed.

At station 4, strip 202 has two larger apertures 230 gutted out of strip 202. Apertures 230 are generally square in shape and have a first side 232, a second side 234, a third side 236, and a fourth side 238. First side 232 and third side 236 are generally straight and parallel to first end 208 of strip 202. Second side 234 and fourth side 238 are generally straight and parallel to second end 212 and fourth end 214 of strip 202. Aperture 230 is located near second side 112. At station 5, two slits 240 are cut into strip 202. Slits 240 extend from apertures 230 to near third end 214.

At station 6, a first slit 242, a second slit 244, and a third slit 246 are cut into strip 202. First slit 242 and third slit 246 are formed approximately midway between second side 112 and third end 214 of strip 202. In addition first slit 242 and third slit 246 are approximately straight and perpendicular to each other. Second slit 244 is formed approximately perpendicular to first slit 242 and third slit 246. Together, first slit 242, second slit 244, and third slit 246 form lance 120 on ground pin 92 (see FIG. 4).

At stations 7 through 9, a rolling operation occurs, which begins to form body portion 93 of ground pin 92. Slits 240 have an edge 250, which are rolled away from a front surface 252 of strip 202, forming body portion 93. In order to roll edges 250 to form body portion 93, a rod (not shown) may be used to assist in forming a generally cylindrical shape. Edges 250 create slot 124. In addition, at station 9, a lower end 254 of strip 202 is cut away. Station 10 reflects the completed ground pin 92 and carrier assembly 90. Once carrier assembly 90 is complete, strip 202 may be cut to the appropriate length needed so that it can be inserted into base 12. It is recognized that ground pin 92 may be formed with more or less slots and that the above-described embodiment is just one embodiment of ground pin 92.

Figure 7:
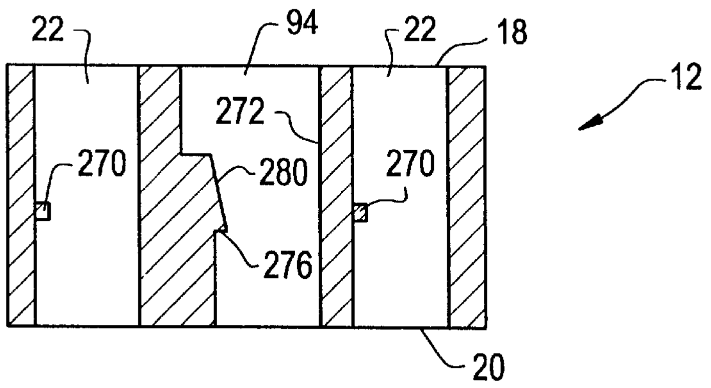
FIG. 7 is a cross-section of the base of FIG. 2.
Figure 8:
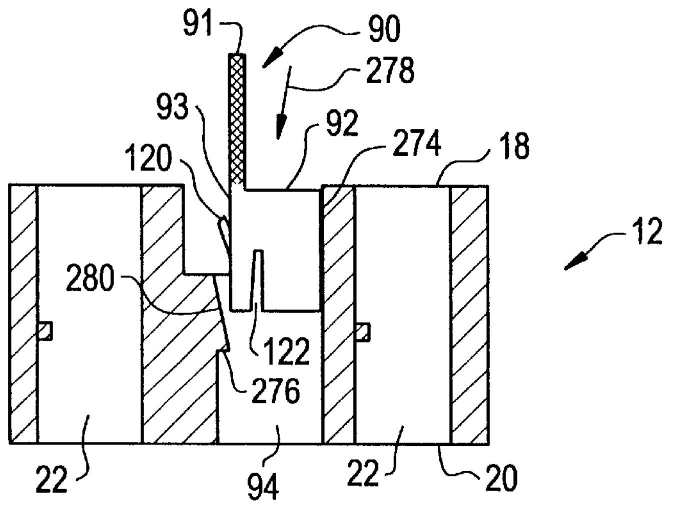
FIG. 8 is a cross-section of the base with the carrier assembly of FIG. 2.
Figure 9:
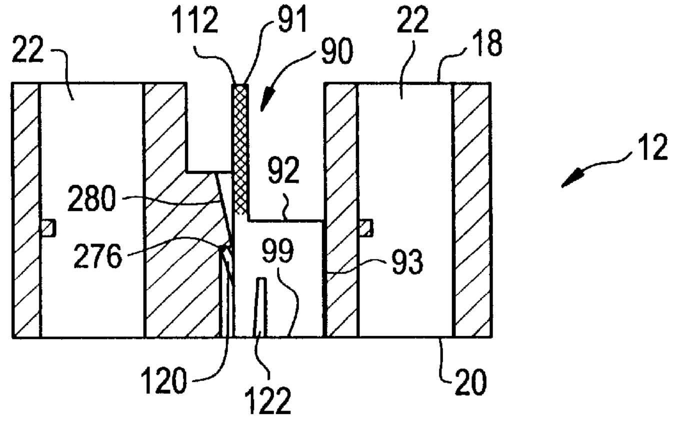
FIG. 9 is a cross-section of the base with the carrier assembly of FIG. 2.

Referring to FIGS. 7 through 9, a cross-section of base 12 is illustrated. Holes 22 and 94 are disposed in base 12, with rows of holes 22 located on either side of a row of holes 94. Holes 22 have a notch 270, which allow for connector pins (not shown) to have a compression fit with holes 22. Hole 94 is generally cylindrical in shape with an inside diameter 272 larger than an outside diameter 274 of ground pin 92. Extending inwardly from base 12 along a portion of the circumference of hole 94 is an angled d é tente 276. Ground pin 92 is inserted in hole 94 from front surface 18 towards rear surface 20 as carrier assembly 90 is forced in the direction indicated by arrow 278. Lance 120 of ground pin 92 is aligned with angled d é tente 276 formed in base 12. As carrier assembly 90 is forced in the direction indicated by arrow 278, lance 120 is forced against an angled surface 280 of angled d é tente 276, causing lance 120 to flex inward towards body portion 93 of ground pin 92. When ground pin 92 is fully inserted in hole 94, as shown in FIG. 9, lance 120 is released from angled surface 280 and ground pin 92 is secured in hole 94 by interaction between lance 120 and angled d é tente 276. In the fully inserted position, second side 112 of connector strip 91 is flush with front surface 18, and end 99 of body portion 93 is flush with rear surface 20.

Figure 10:
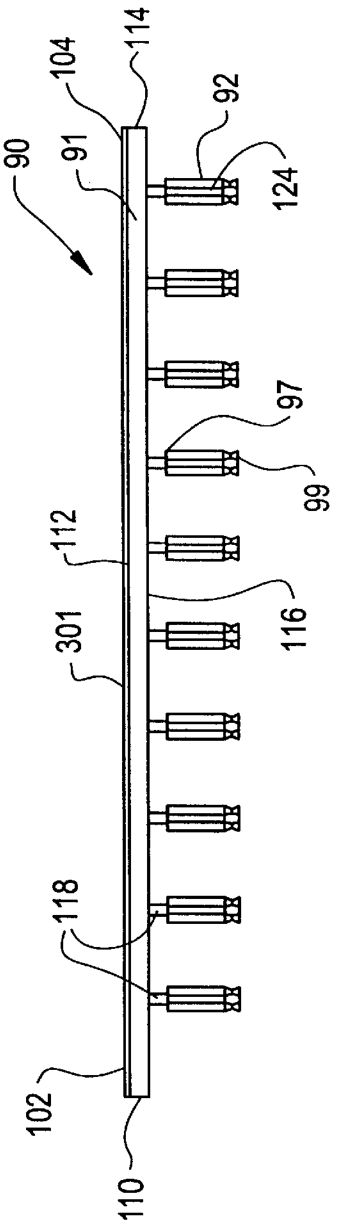
FIG. 10 is a front view of an alternative embodiment of the carrier assembly of FIG. 3.
Figure 11:
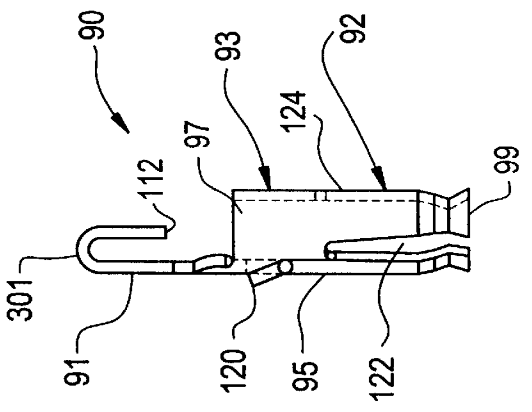
FIG. 11 is a ground pin of the carrier assembly of FIG. 10.

Referring to FIGS. 10 and 11, a second embodiment of carrier assembly 90 is illustrated. Carrier assembly 90 is manufactured as described in FIGS. 5 and 6. An additional step is then added in which connector strip 91 is folded over to produce a u-shape connector strip 301. It is desirable to fold connector strip 91 because it is means to increase surface area and current carrying capability. In addition, by folding connector strip 91, a stronger connector strip is obtained, which makes for a more durable manufacturing component that is less likely to become damaged during handling process.

Figure 12:
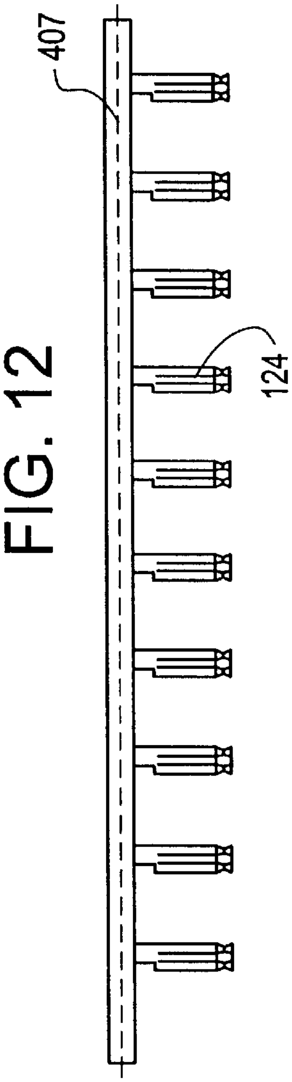
FIG. 12 is a front view of an alternative embodiment of the carrier assembly of FIG. 3.
Figure 13:
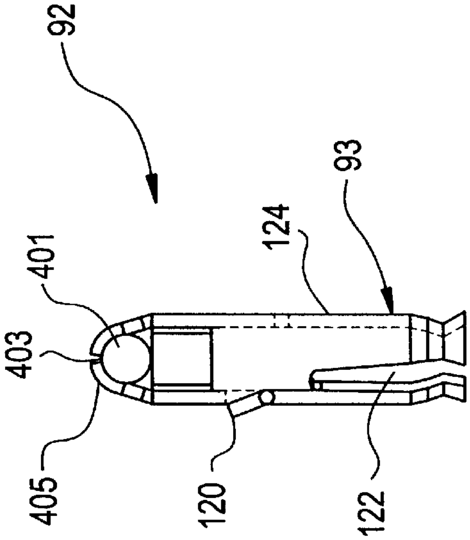
FIG. 13 is a ground pin of the carrier assembly of FIG. 12.

Referring to FIGS. 12 and 13, a third embodiment of carrier assembly is illustrated. Carrier assembly 90 is manufactured as described in FIGS. 5 and 6. However, ground pin 92 also includes an additional aperture 401, which is gutted out during the progressive die manufacturing process. The end result of aperture 401 is that it is generally circular in shape. In addition, there is an additional opening 403 at a top end 405 of ground pin 92. Additional steps include separating ground pin 92 from connector strip 91 and then reattaching connector strip 91 to a round strip 407 that is formed from a conductive material. Opening 403 allows ground pin 92 to be secured onto strip 407.

In all three concepts, soldering of the ground pin to a conductive strip is no longer necessary because the ground pin is either already attached to strip through the progressive die manufacturing process or the ground pin is secured onto strip. The carrier assembly decreases the time to assemble the surge protector assembly because an entire strip is inserted simultaneously into the base, rather than one ground pin at a time and the additional step of soldering each ground pin to the connector strip is eliminated. Additionally, by eliminating the soldering step, efficiency and product quality is improved.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A carrier assembly for a surge protection assembly comprising:

a connector strip;

a plurality of pins extending from said connector strip; and wherein said connector strip and said plurality of pins are absent a solder or weld joint therebetween and are formed from a single piece of conductive material.

2. The carrier assembly of claim 1, wherein said plurality of pins includes a ground pin.

3. The carrier assembly of claim 1, wherein a pin from said plurality of pins includes a lance, said lance is formed from said single piece of conductive material.

4. The carrier assembly of claim 1, wherein said connector strip is folded into a u-shape.

5. The carrier assembly of claim 1, wherein a pin from said plurality of pins includes a slot.

6. A surge protector assembly comprising:

a base having a plurality of first holes disposed therein;

a carrier assembly including:

a connector strip, and a plurality of pins extending from said connector strip, said plurality of pins are received by said plurality of first holes, said connector strip and said plurality of pins are absent a solder or weld joint therebetween and are formed from a single piece of conductive material.

7. The surge protector of claim 6, wherein said plurality of pins includes a ground pin.

8. The surge protector of claim 6, wherein a pin from said plurality of pins includes a lance, said lance is formed from said single piece of conductive material.

9. The surge protector of claim 6, wherein said connector strip is folded into a u-shape.

10. The surge protector of claim 6, wherein a pin from said plurality of pins includes a slot.

11. The surge protector of claim 6, wherein said plurality of first holes includes a déetente.

12. The surge protector of claim 6, further comprising a connector socket having a plurality of leads.

13. The surge protector of claim 12, further comprising a multi-layer printed circuit board having a plurality of second holes, said plurality of second holes are aligned with said plurality of first holes, said multi-layer printed circuit board is coupled with said base, said multi-layer printed circuit board is coupled with said connector socket.

14. A method of assembling a surge protection assembly, said method comprising:

providing a base with a plurality of holes disposed therein;

providing a carrier assembly having a plurality of ground pins electrically connected to a connector strip absent a solder or weld joint therebetween; and inserting said carrier assembly into said plurality of holes.

15. The method of claim 14, further comprising soldering said carrier assembly to a transverse rail.

16. The method of claim 14, further comprising mounting a multi-layer printed circuit board to said base, said multi-layer printed circuit board is coupled with a socket.

17. The method of claim 14, further comprising forming said carrier assembly from a single piece of conductive material.

18. The method of claim 14, further comprising securing said plurality of ground pins onto a strip to form carrier assembly.

19. The method of claim 14, further comprising securing said plurality of ground pins to said base by having a lance feature on a pin of said plurality of ground pins engage said base.

20. A surge protection assembly comprising:

a base with a plurality of holes disposed therein;

a carrier assembly having a plurality of ground pins electrically connected to a connector strip absent a solder or weld joint therebetween; and means for inserting said carrier assembly into said plurality of holes.

* * * * *